April 1, 1952  E. L. STOUT ET AL  2,590,901
PRODUCTION OF LIGHTWEIGHT AGGREGATE FROM MOLTEN SLAG
Filed April 20, 1951
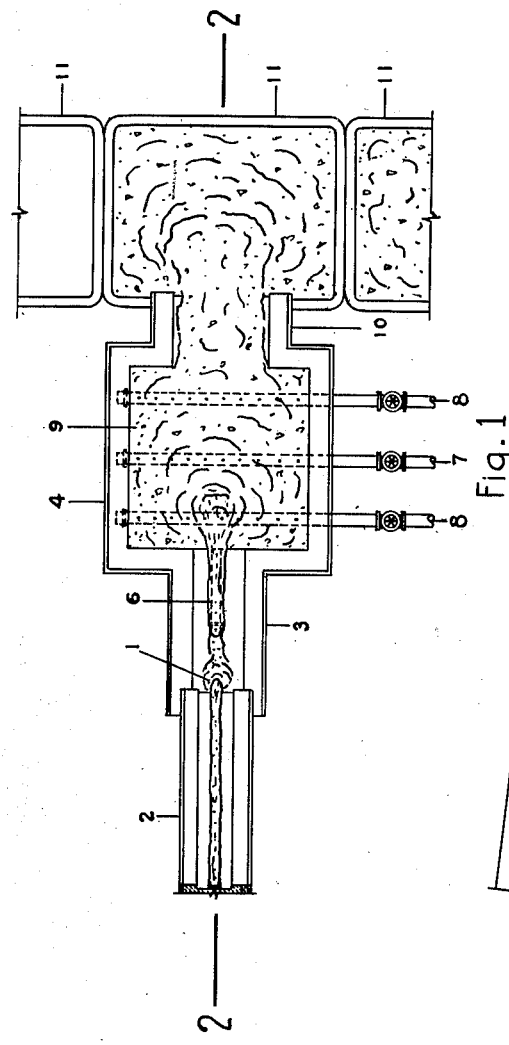
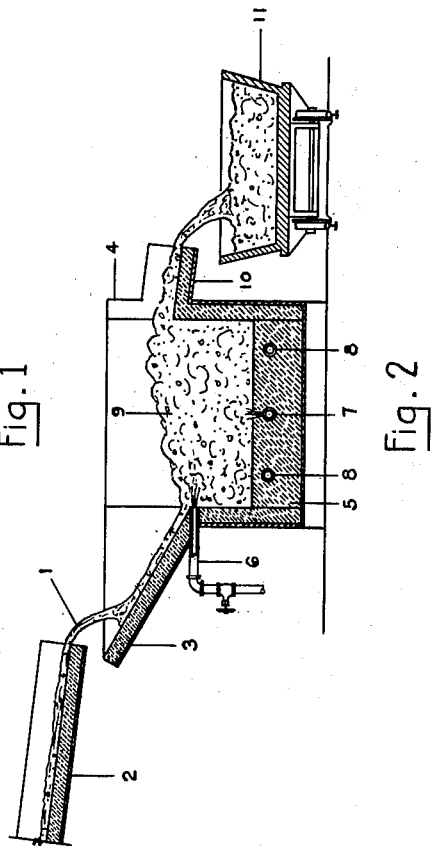
Edgar L. Stout,
William C. Scott, Jr., and
John M. Stinson  INVENTORS.
BY Bentley Morrow
Attorney Patented Apr. 1, 1952

2,590,901

UNITED STATES PATENT OFFICE 2,590,901

PRODUCTION OF LIGHTWEIGHT AGGREGATE FROM MOLTEN SLAG

Edgar L. Stout, Sheffield, William C. Scott, Jr., Florence, and John M. Stinson, Sheffield, Ala., assignors to Tennessee Valley Authority, a corporation of the United States Application April 20, 1951, Serial No. 222,126

4 Claims. (Cl. 49—77.5)

(Granted under the act of March 3, 1883, as amended April 30, 1928; 370 O. G. 757)

The invention herein described may be manufactured and used by or for the Government for governmental purposes without the payment to us of any royalty therefor.

This invention relates to a method for the production of lightweight material suitable for use as aggregate for concrete and the like from slag. It relates particularly to improved methods for expanding and chilling molten slag by introducing controlled quantities of water and gas into molten slag.

Expanded or foamed slag has been marketed for a number of years in the United States and for longer periods of time in Europe. Such products are usually made by contacting molten blast-furnace or electric-furnace slag with a controlled quantity of water. The resulting steam causes expansion of the slag into a porous, foam-like material which is cooled and solidified in the expanded state.

Various types of machines and processes have been devised for expanding slag. Perhaps the simplest method consists in running the molten slag into a pit in which is contained a quantity of water amounting to, roughly, one-third of the weight of the slag. In a modification of this method Schol, British Patent 839 (1914), proposed pouring molten slag onto a bed of wet sand or like granular material. According to the method of Gallai-Hatchard, U. S. Patent 2,443,103, molten slag is poured into a pit having a porous bottom which is saturated with water prior to introduction of slag. Immediately after the slag is poured, water is injected upward into the mass by means of nozzles embedded in the porous bottom. While these methods have the marked advantage of simplicity, they require a large amount of space. Moreover, the aggregate produced by these methods is not always uniform in density and strength.

Machines and methods, however, have been developed which are capable of producing a uniform lightweight aggregate from iron blast-furnace slag. Expansion in such machines and methods is accomplished very rapidly. These machines and methods are not satisfactory however for the production of strong lightweight aggregate from slag produced by furnaces for the reduction of phosphate rock. Such slag differs in composition and in physical properties from slag produced in iron blast furnaces. When attempts are made to utilize phosphate-furnace slag by methods developed for the expansion of iron blast-furnace slag, the product usually is worthless for one of the following reasons: The product is granulated slag rather than a foamed or expanded slag; or, when a foamed or expanded product is produced it is found to be very weak and friable; or, a foamed product is produced, but it is found to have very poor structure with irregular voids and is likely to be too heavy.

It is an object of this invention to provide a method for producing a strong lightweight aggregate from phosphate-reduction furnace slag.

Another object is to provide such method whereby substantially all the lightweight aggregate produced is uniform in density and in strength.

Another object is to provide a method for expanding molten slag which may be carried out simply and cheaply.

Other objects and advantages will become apparent as this disclosure proceeds.

We have found that these objects may be attained by providing a bed of inert granular material in the bottom of an expansion zone; saturating the inert granular material with water; flowing a stream of molten slag into said expansion zone upon said bed of granular material; and simultaneously introducing a controlled stream of water into and beneath the stream of molten slag adjacent to the point at which the slag enters the expansion zone; agitating the resulting mixture in the expansion zone; and overflowing the resulting molten expanding mixture into a cooling zone wherein additional expansion occurs as the mass cools to the point of solidification.

The attached drawings illustrate one type of apparatus in which the process of our invention may be carried out. Figure 1 is a plan view of the apparatus. Figure 2 is a vertical section on the line 2—2 of Figure 1. Like parts and material are identified by like reference numerals in both figures.

In both figures molten slag 1 from a phosphate reduction furnace (not shown) is shown entering via slag trough 2 into inlet trough 3 of an expansion vessel 4. A layer of granular material 5, which may be sand, granulated slag, or the like, is disposed in the bottom of expansion vessel 4. The layer of granular material 5 is saturated with water prior to introduction of slag, preferably by introducing water through line 8. At least one controlled stream of water is introduced through valved line 6 into the molten slag beneath the stream of slag and adjacent to the point at which the stream of molten slag enters expansion vessel 4 through inlet trough 3. The stream of molten slag is expanded or foamed by action of steam produced from water introduced via line 6. When introduction of slag into the expansion vessel 4 is first begun, some of the molten slag may not be expanded sufficiently by water introduced from line 6 and may fall to the bottom of the vessel in an unexpanded state. The water within the bed of granular material 5 serves to expand such slag at the beginning of the run.

After the run is well under way and expansion vessel 4 is filled to overflowing with processed slag, water introduced through line 6 effectively expands all slag introduced. During the run steam, air, or other inert gas is continuously introduced through holes in the top of valved line 7, embedded in the layer of granular material 5. This inert gas is introduced at such velocity and in quantity sufficient to agitate slag in the expansion vessel with a stirring or churning motion and is not effective in itself in expanding the slag. Agitation of the mass of slag during expansion is necessary to ensure a uniformly expanded product.

Molten slag at temperatures above 1350° C. may be used in this process, and we prefer to operate using slag at temperatures between 1450° and 1550° C. At temperatures below 1350° C., products produced are usually of poor quality. Temperatures up to 1600° C. may be used, and the operation is usually limited to that temperature since slag tapped from an electric phosphate-reduction furnace usually is not at a temperature above 1600° C. The rate of flow of slag is regulated so that the introduction of slag proceeds at a rate from 90 to 245 pounds per minute per cubic foot of capacity of expansion vessel 4. The quantity of water introduced via line 6 is so controlled that the water used is from 7 to 20 per cent of the weight of slag.

Under these conditions expanded but still molten slag 9 formed within the vessel 4 is at glowing heat and is fluid. After initial introduction of molten slag into expansion vessel 4, the level of the molten expanded slag rises rapidly, and the molten expanded slag overflows the vessel via overflow lip 10 into a cooling zone, which may preferably be chill cars 11, where additional expansion continues to occur as the mass cools to the point of solidification. The chill cars 11 are drawn successively from under overflow lip 10 as they become filled and this procedure is continued until the slag tap has been completed. After the slag in chill cars 11 has solidified, the cars are emptied and the product is crushed for use as concrete aggregate.

A pan conveyor, a stationary pit, or other suitable cooling space may be used to receive the expanded slag overflowed from expansion vessel 4 instead of the chill cars shown.

When operating at high rates of slag flow, such as 135 to 145 pounds of slag per minute per cubic foot of expansion zone capacity, it is best to introduce a small proportion of the water used into the bed of granular material 5 beneath the expanding slag, especially when only one stream of water is introduced via line 6 at the point of entry of slag into the expansion zone. Although water introduced through the bed of granular material 5 is not utilized efficiently, at very high slag-flow rates we have found that expansion proceeds more smoothly if a little of the water is introduced through lines 8. This apparently is owing to the fact that a single stream of water introduced at a location such as that shown by line 6 is imperfectly distributed through the stream of molten slag.

*Example I*

We have carried out our process using apparatus similar in design to that shown in the drawing. The inside of the firebrick lined expansion vessel was 20 inches square by 24 inches deep. The molten slag inlet trough terminated 10 inches below the upper edge of the vessel and the expanded slag overflow lip was also located 10 inches below the upper edge. The vessel contained a layer of granulated phosphate-reduction furnace slag about 3½ inches deep, thus giving an effective expansion zone of 3.24 cubic feet. Inserted within this granulated slag layer, and extending across the inside of the vessel, were two water-inlet pipes 8 and one gas-inlet pipe 7, situated as shown in the drawing. The centers of these pipes were 2 inches above the steel bottom of the vessel. Each of these pipes was ½-inch standard pipe and had ten $\frac{1}{16}$-inch diameter holes drilled at ½-inch intervals along the upper surface. The primary water inlet was a ½-inch pipe located as shown by line 6 in the drawing. Expanded slag which overflowed the expansion vessel was received and cooled in a steel pan in some tests and, in other tests, was flowed directly onto a concrete floor.

In a series of preliminary tests, cooled phosphate reduction-furnace slag was remelted in a 600 kw. electric furnace. Temperatures were predetermined by the conditions in which this furnace was operated. Slag was tapped from this furnace at temperatures in the range from 1245° to 1575° C. as measured with an optical pyrometer. At temperatures below 1350° C. it was found that the slag did not yield a satisfactory product but was imperfectly expanded and was too heavy for use as lightweight aggregate. At temperatures from 1350° to 1370° C. a satisfactory product was produced, although heavier than would be desired in many applications. It was found that the weight ratio of water to slag, the point of introduction of water, and agitation or stirring of the mass of expanded slag within the expansion zone were critical factors affecting the quality of the product. Expanded products having an average bulk density of 42 pounds per cubic foot were obtained in tests in which the water introduced was controlled within the range from 7 to 20 per cent of the weight of the slag. It was found that water in excess of this range resulted in either a weak and friable or a granulated product, and that if less than 7 per cent of water was used the product was not sufficiently expanded to be suitable for use as a lightweight aggregate. Agitation was found to be necessary to produce a uniformly expanded product having good cellular structure. Both compressed air and steam were used.

*Example II*

A series of final tests were made using molten slag tapped directly from a large phosphate-reduction furnace into the apparatus described under Example I. In these tests quantities up to 5000 pounds of molten slag were tapped in each run. Slag-flow rates varied from 100 to 1500 pounds per minute. Slag temperatures were in the range from 1350° to 1550° C.

The same critical factors were found to affect the quality of product obtained in these tests as in Example I. In addition it was found that the rate of flow of slag must be controlled in the range from about 90 to about 245 pounds per minute per cubic foot of effective expansion space in the expansion zone. The apparatus was found to operate most smoothly when the rate of flow was in the range from 130 to 200 pounds of slag per minute per cubic foot of available expansion space. At very high rates of slag flow in the range from 200 to 245 pounds per minute per cubic foot of expansion space, it was found that the process operated best when a small amount of the water used, not exceeding 5 per cent of the weight of slag, was introduced through the granular bed in the bottom of the expansion vessel. Following each run, the cooled slag was crushed to pass a ⅜-inch screen. The bulk density of the product was then determined. Results of representative tests are given in the table below.

| Pounds slag per minute | Pounds slag per pound water | Pounds slag per pound steam | Slag temp., °C. | Bulk density of −⅜" product |
|---|---|---|---|---|
| 233 | 5.2 | 1.21 | 1,435 | 41.0 |
| 345 | 10.7 | | 1,350 | 38.0 |
| 407 | 7.3 | 1.73 | 1,450 | 44.0 |
| 571 | 14.7 | 3.96 | 1,405 | 41.0 |
| 746 | 21.3 | 6.66 | 1,400 | [1] 50.0 |

[1] Insufficient water gave high bulk density.

Concrete blocks were made from such expanded slag and tested for strength. These blocks were found to be not only light in weight but much stronger than concrete blocks made with granulated or unexpanded slag.

We claim as our invention:

1. A process for expanding molten slag produced by smelting phosphate rock, which comprises introducing a stream of such slag at a temperature of not less than 1350° C. into an expansion zone having a layer of inert granular material previously saturated with water in the bottom thereof; controlling the rate of flow of said slag in the range from 90 to 245 pounds per minute per cubic foot of effective expansion space in said zone; introducing at least one stream of water into said stream of slag at a point beneath the stream of slag and adjacent to its entrance into said expansion zone; controlling the quantity of water so introduced in the range from 7 to 20 per cent of the weight of slag introduced; agitating the resulting mixture in said expansion zone; and overflowing the resulting molten expanding mixture into a cooling zone.

2. A process for expanding molten slag produced by smelting phosphate rock, which comprises introducing a stream of such slag at a temperature of not less than 1350° C. into an expansion zone having a layer of inert granular material previously saturated with water in the bottom thereof; controlling the rate of flow of said slag in the range from 130 to 200 pounds per minute per cubic foot of effective expansion space in said zone; introducing at least one stream of water into said stream of slag at a point beneath the stream of slag and adjacent to its entrance into said expansion zone; controlling the quantity of water so introduced in the range from 7 to 20 per cent of the weight of slag introduced; agitating the resulting mixture in said expansion zone; and overflowing the resulting molten expanding mixture into a cooling zone.

3. A process for expanding molten slag produced by smelting phosphate rock, which comprises introducing a stream of such slag at a temperature in the range from 1400° to 1550° C. into an expansion zone having a layer of inert granular material previously saturated with water in the bottom thereof; controlling the rate of flow of said slag in the range from 130 to 200 pounds per minute per cubic foot of effective expansion space in said zone; introducing at least one stream of water into said stream of slag at a point beneath the stream of slag and adjacent to its entrance into said expansion zone; controlling the quantity of water so introduced in the range from 7 to 20 per cent of the weight of slag introduced; agitating the resulting mixture in said expansion zone by jets of inert gas introduced beneath said mixture; and overflowing the resulting molten expanding mixture into a cooling zone.

4. A process for expanding molten slag produced by smelting phosphate rock, which comprises introducing a stream of such slag at a temperature in the range from 1400° to 1550° C. into an expansion zone having a layer of inert granular material previously saturated with water in the bottom thereof; controlling the rate of flow of said slag in the range from 200 to 245 pounds per minute per cubic foot of effective expansion space in said zone; introducing at least one stream of water into said stream of slag at a point beneath the stream of slag and adjacent to its entrance into said expansion zone; controlling the quantity of water so introduced in the range from 10 to 15 per cent of the weight of slag introduced; introducing water in quantity not exceeding 5 per cent of the weight of slag into the bed of granular material in the bottom of said zone; agitating the resulting mixture in said expansion zone by jets of inert gas introduced beneath said mixture; and overflowing the resulting molten expanding mixture into a cooling zone.

EDGAR L. STOUT.
WILLIAM C. SCOTT, JR.
JOHN M. STINSON.

No references cited.